United States Patent
Kurz et al.

(10) Patent No.: US 7,071,680 B2
(45) Date of Patent: *Jul. 4, 2006

(54) POSITION TRANSDUCER DEVICE

(75) Inventors: Martin Kurz, Ebersbach/Fils (DE);
Gerd Eckel, Wendlingen (DE); Roland Holder, Dettingen/Teck (DE);
Hansjuergen Eberle, Neckartenzlingen (DE); Roland Springer, Neuhausen (DE); Michael Hoffmann, Neuhausen (DE); Walter Roth, Wolfschlugen (DE)

(73) Assignee: Balluff GmbH, Neuhausen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/100,071

(22) Filed: Apr. 5, 2005

(65) Prior Publication Data
US 2005/0174108 A1    Aug. 11, 2005

Related U.S. Application Data

(63) Continuation of application No. 10/180,110, filed on Jun. 27, 2002, now Pat. No. 6,903,544.

(30) Foreign Application Priority Data

Oct. 23, 2001    (DE) ............................... 101 53 488
Oct. 23, 2001    (DE) ............................... 101 53 489

(51) Int. Cl.
*G01B 7/14* (2006.01)
(52) U.S. Cl. .................................. 324/207.13; 324/244
(58) Field of Classification Search ........... 324/207.11, 324/207.13–207.26, 244, 250, 260; 73/313–314
See application file for complete search history.

(56) References Cited

U.S. PATENT DOCUMENTS

| 3,898,555 | A | 8/1975 | Tellerman |
| 4,643,508 | A | 2/1987 | Schaller |
| 4,865,281 | A | 9/1989 | Wollar |
| 4,952,873 | A | 8/1990 | Tellerman |
| 5,136,884 | A | 8/1992 | Lovett |
| 5,313,160 | A | 5/1994 | Gloden et al. |

(Continued)

FOREIGN PATENT DOCUMENTS

DE        31 15 587        11/1982

(Continued)

OTHER PUBLICATIONS

*Patent Abstracts of Japan*, "Displacement Detector", Publication No. 08285563, Nov. 1, 1996.

(Continued)

*Primary Examiner*—Bot LeDynh
(74) *Attorney, Agent, or Firm*—Lipsitz & McAllister, LLC (57) ABSTRACT

A position transducer device is provided for detecting the position of a position transmitter. The position transducer device comprises a housing extending in a longitudinal direction and a measuring sensor arranged in the housing and extending parallel to the longitudinal direction. The position transmitter is coupled to the measuring sensor in a non-contacting manner. The outer surface of the housing is designed such that it can be enclosed at least partially by a fixing receiving means for fixing the housing to an application. The housing can be rotated relative to the position transmitter in the fixing receiving means in order to enable adjustment of the distance between the measuring sensor and the position transducer.

32 Claims, 4 Drawing Sheets

U.S. PATENT DOCUMENTS

| | | | |
|---|---|---|---|
| 5,514,961 | A | 5/1996 | Stoll et al. |
| 5,736,855 | A | 4/1998 | Smith et al. |
| 5,903,426 | A | 5/1999 | Ehling |
| 5,923,164 | A | 7/1999 | Ehling et al. |
| 6,243,928 | B1 | 6/2001 | Powell |
| 6,356,071 | B1 | 3/2002 | Koski et al. |
| 6,903,544 | B1 * | 6/2005 | Kurz et al. ............ 324/207.13 |

FOREIGN PATENT DOCUMENTS

| | | |
|---|---|---|
| DE | 32 03 520 | 8/1983 |
| DE | 41 16 651 | 1/1992 |
| DE | 42 44 204 | 6/1994 |
| DE | 43 06 539 | 9/1994 |
| DE | 43 06 951 | 9/1994 |
| DE | 691 03 441 | 9/1994 |
| DE | 43 34 811 | 4/1995 |
| DE | 195 04 608 | 8/1996 |
| DE | 196 53 222 | 7/1998 |
| DE | 297 04 780 | 8/1998 |
| DE | 298 11 117 | 11/1998 |
| DE | 199 17 312 | 10/1999 |
| DE | 198 32 533 | 11/1999 |
| EP | 0 366 227 | 5/1990 |
| EP | 0 471 073 | 2/1992 |
| EP | 0 987 521 | 3/2000 |
| FR | 2 749 384 | 12/1997 |

OTHER PUBLICATIONS

Ametek, Inc., "Series 952 Gemco Blue OX LDT with Quadrature Output" specification sheet, AMETEK Patriot Sensors, 2 pages, date of publication unknown.

MTS Sensor Technologie GmbH & Co. KG, brochure entitled "Die magnetostriktiven Positionssensoren", Apr. 2001.

BALLUFF GmbH, brochure entitled Micropulse Wegaufinehmer BTL, cover pages, date unknown.

GEFRAN spa, date sheet entitled "PZ12 Rectilinear Displacement Transducer With Cylindrical Case", Oct. 1999.

GEFRAN information sheet entitled "PC Linearpotentiometer", date unknown.

GEFRAN information sheet entitled "PZ12 Linearpotentiometer im zylindrischem Gehäuse", date unknown.

GEFRAN catalog "Wegaufinehmer, Drehgeber", date unknown.

Patent Abstracts of Japan,JP 60031013, Position Sensor Wherein Magnetoresistance Body is Used, Publication Date Feb. 16, 1985.

Patent Abstracts of Japan,JP 60031014, Position Sensor Wherein Magnetoresistance Body is Used, Publication Date Feb. 16, 1985.

Patent Abstracts of Japan,JP 60031015, Position Sensor Wherein Magnetoresistance Body is Used, Publication Date Feb. 16, 1985.

Gefran catalog, "Sensors Catalog", Oct. 1999 (66 pages).

Product sheet of Gefran, "Betriebs- und Wartungsanleitung fur Massedruckaufnehmer zum Einsatz bei Hochtemperaturen", Feb. 25, 1997 (4 pages).

Santest Co., Ltd. brochure, "Linear Profile Version GY Series—Model GYKM," 4 pages, publication date unknown.

Six photographs of a transcucer manufactured by BALLUFF GmbH, Jul. 1998.

BALLUFF GmbH catalogue, "BALLUFF Edition F," Jul. 1998.

* cited by examiner

POSITION TRANSDUCER DEVICE

This application is a continuation of, commonly assigned U.S. patent application Ser. No. 10/180,110 filed on Jun. 27, 2002 now U.S. Pat. No. 6,903,544, which claims the benefit of German applications Nos. 101 53 488 and 101 53 489, both of Oct. 23, 2001, each of which is incorporated herein and made a part hereof by reference.

BACKGROUND OF THE INVENTION

The invention relates to a position transducer device for detecting the position of a position transmitter, comprising a housing extending in a longitudinal direction and a measuring sensor arranged in the housing and extending parallel to the longitudinal direction, the position transmitter being coupled to the measuring sensor without contact.

Position transducer devices of this type are known, for example, from DE 43 06 951 A1, U.S. Pat. Nos. 5,903,426 or 5,923,164.

The position of a movable machine element, to which the position transmitter is coupled, may be detected by means of these devices. In this respect, transonic position transducer devices are used, in particular, with which the position transmitter is a permanent magnet or electromagnet and the position is determined via the propagation time of propagating mechanical waves on a waveguide comprised by the measuring sensor.

Position transducer devices of this type have a plurality of uses.

Proceeding from this, the object underlying the invention is to provide a position transducer device which is variable in its use for a user.

SUMMARY OF THE INVENTION

The object specified at the outset is accomplished in accordance with the invention in that an outer surface of the housing is designed such that it can be enclosed at least partially by a fixing receiving means for fixing it to an application and the housing can be rotated in the fixing receiving means.

A user can, as a result, insert the position transducer device into the fixing receiving means and then turn it, for example, towards the position transmitter on its track such that an optimum detection result is achieved. As a result, great variability results for the use of the inventive position transducer device since the final position of the housing need not be determined by the positioning of the fixing receiving means relative to the application.

It is provided, in particular, for the outer surface of the housing to have a high degree of symmetry with respect to the longitudinal direction of the housing and to be, in particular, essentially rotationally symmetric. This may be achieved, for example, in that at least one outer surface of the housing is of a cylindrical design with a circular profiled cross section or a polygonal cross section with a plurality of corners, for example, ten corners or more.

It is particularly advantageous when the housing surface has a marking which extends in a longitudinal direction and indicates a measurement side. As a result, it is indicated to a user where the effective measurement side of the position transducer device is located and so he can position the housing and the position transmitter so as to be aligned relative to one another in an optimum manner. It may be provided for the marking to be formed by a groove. It may also be provided, in particular, for the marking to be formed by a flattened area, wherein the groove itself can also represent a corresponding flattened area in order to prevent the housing from rolling away.

In this respect, the measuring sensor is, in particular, at a minimum distance in relation to the marking so that the position transmitter acts on the measuring sensor in an optimum manner in order to generate corresponding position measuring signals with a high signal-noise ratio.

It may, in addition, be provided for one or more transverse markings to be applied to the housing which indicate the measurement area. As a result, the effective measurement area, in which positions of the position transmitter may be detected, is specified directly to a user. As a result, the positioning between position transducer device and position transmitter is again made easier for the user.

It may be provided, in particular, for the housing to be of a cylindrical design. Such a housing may be produced in a simple and inexpensive manner, for example, by means of extrusion molding. It has a high degree of symmetry, i.e., it may easily be turned in a corresponding fixing receiving means.

It is particularly favorable when the housing is of a tubular design. As a result, it is also possible, for example, for an interior of the housing to be essentially rotationally symmetric to a longitudinal direction of the housing. As a result, a corresponding cover element may, on the other hand, be inserted into the housing in a simple manner and a sealed closure may be provided without the cover needing, for example, to be screwed to the housing.

Favorably, the housing has on its outer surface a flattened area, by means of which the housing can be placed on a support. As a result, the handling capability of the position transducer device during the production and also during the fixing of an application is increased since any rolling away of the housing is avoided. The wording "essentially" with respect to the rotationally symmetric design also relates also to the fact that the rotational symmetry does not exist in the region of the flattened area.

It may be provided for the position transmitter to be free floating relative to the housing. As a result, a user is given extensive possibilities for variation with respect to the relative positioning between position transmitter and position transducer device without him being bound to a mechanical coupling of the position transmitter to the housing of the position transducer device.

It may, however, also be provided alternatively for the position transmitter to be guided on the housing. In the case of a rotationally symmetric configuration of at least one outer surface of the housing, the position transmitter may then be of a bracket-like design and guided on the housing.

A fixing receiving means is designed, in particular, as a retaining clamp. In a first embodiment, a retaining clamp is of a bracket-like design such that the housing can be fixed between a holding bracket of the retaining clamp and the application, i.e., the housing may be clamped to a corresponding surface of the application via the retaining clamp.

In a second embodiment, a retaining clamp is of a clip-like design, wherein the housing can be fixed in the holding clip. The housing is therefore placed in the holding clip and held in this holding clip.

In this respect, it may be provided for the position transducer device to be adapted to be fixed on the retaining clamp via one or more fixing screws between the housing and the holding clip, i.e., the receiving position of the housing in the retaining clamp is, in particular, secured.

In a third embodiment, a retaining clamp comprises a first holding element with a first holding recess and a second holding element with a second holding recess, wherein the housing of the position transducer device is held between the two holding elements in the two holding recesses.

Favorably, the two holding elements can be fixed to one another via one or more fixing screws in order to thereby clamp the housing in the holding recesses. The fixing screws may serve at the same time to fix the retaining clamp on a machine.

Alternatively, it may be provided for the housing of the position transducer device to be adapted to be fixed on an application in a recess. When the housing is of an essentially rotationally symmetric design, such a recess may be provided in a simple manner, for example, by drilling out.

In addition, it is favorable when the housing is produced from a material with a high electrical and/or thermal conductivity, such as, for example, brass, zinc or aluminum in order to obtain a high EMC strength.

In principle, it may be provided for the housing to be closed at one end, i.e., for a cover to be formed in one piece with the housing. It is advantageous when the housing is open at both ends so that it can be closed by covers. Such a housing may be produced in a simple manner since a cover need not be produced integrally with it.

In this respect, a cover for closing the housing can, in particular, be fixed to this without screws so that, as a result, the production is possible in an inexpensive manner.

A cover for closing the housing advantageously has a knurled area for dipping into the housing. A good fixing of the cover to the housing may be achieved via this knurled area, wherein a high system of protection, such as IP 67, may be achieved with little expenditure.

BRIEF DESCRIPTION OF THE DRAWINGS

The present invention will hereinafter be described in conjunction with the appended drawing figures, wherein like reference numerals denote like elements, including.

DETAILED DESCRIPTION OF THE INVENTION

Figures 1, 2:
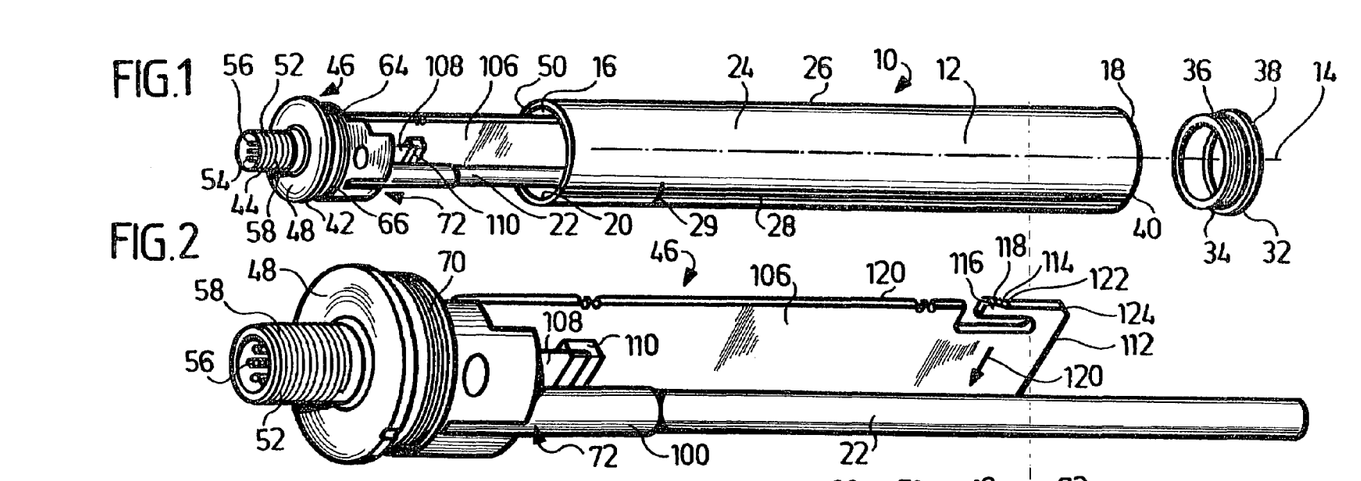
FIG. 1 shows a perspective view of one embodiment of an inventive position transducer device in an exploded illustration.
FIG. 2 shows a perspective view of a cover-connection element unit according to FIG. 1.

One embodiment of an inventive position transducer device which is designated in FIG. 1 as a whole as 10 comprises a housing 12 which extends in a longitudinal direction 14. The housing 12 is, in particular, of a cylindrical, tubular design with a first open end 16 and a second open end 18 located opposite. A housing interior 20 is formed in the housing 12 between the two ends 16 and 18 and this accommodates, inter alia, a measuring sensor 22.

The housing 12 is designed to be essentially rotationally symmetric about a longitudinal axis parallel to the longitudinal direction 14 or coinciding with this. A surface 24 of the housing 12 is designed to be essentially free from edges outside its end edges.

The surface 24 preferably has in the longitudinal direction 14 a slightly flattened area 26 which makes it possible to place or rather position the housing 12, in particular, during the production process without this rolling away.

Furthermore, the surface 24 of the housing 12 is provided with a marking 28, for example, in the form of a groove, wherein the measuring sensor 22 is arranged in the housing 12 such that its distance to the marking 28 is minimal. The marking 28 indicates the active side or rather active surface of the position transducer device 10, i.e., the measurement side and therefore makes it easier for a user to position the inventive position transducer device 10 on an application, for example, a machine tool or the like. A transverse marking 29 may also be provided in order to indicate the measurement area and, in particular, its beginning on the housing. A further marking can indicate the end of the measurement area on the housing 12.

In this respect, it may be provided for the flattened area 26 to be formed via the marking 28.

The housing 12 is preferably produced from a metallic material with a high electrical and/or thermal conductivity so that a high EMC strength is present and, therefore, precise measurement results can be obtained. The material for the housing 12 is a non-magnetic metal in order to be able to use a magnet 30 (cf. FIG. 4 and FIG. 10) as position transmitter. In this respect, a permanent magnet or an electromagnet may be used. Aluminum is used, for example, as material for the housing 12.

The position transmitter is fixed on a movable machine part and moves on a path extending parallel to the position transducer device 10 (i.e., parallel to the longitudinal direction 14), i.e., is free floating in relation to the housing 12. However, it may also be guided on the housing. For this purpose, the position transmitter is, for example, of a bracket-like design.

At its open end 18, the housing 12 is closed via a cover 32 which has a dip-in area 34, with which this cover 32 dips into the interior of the housing 12 and via which the cover 32 is fixed to the housing 12. This dip-in area is, in particular, of a knurled design so that the cover 32 can be fixed to the housing 12 without screws. The interior of the housing 12 is advantageously configured to be essentially rotationally symmetric at least in the area, in which the cover 12 is fixed, and the cover 32 is designed accordingly with its dip-in area 34 in order to be able to connect cover 32 and housing 12 to one another in a simple and sealed manner.

In this respect, it is provided for one or more O-rings 36 to be arranged as seals between the dip-in area 34 and corresponding inner walls of the housing 12 in order to seal the interior 20 from the exterior at the end 18.

In this respect, the O-ring or O-rings 36 are, in particular, integrated into the dip-in area 34 of the cover 32.

The cover 32 has, adjoining the dip-in area 34 and, in particular, formed in one piece with it, a cover disk 38 with a diameter which corresponds essentially to the diameter of the housing 12 transversely to the longitudinal direction 14 so that the cover disk 38 does not project beyond the surface 24 of the housing 12 and, on the other hand, covers an end face 40 of the housing 12 at the end 18 at least partially.

The cover 32 is, again, preferably produced from a metal with a high electrical and/or thermal conductivity, such as brass, in order to effect a high EMC strength.

A cover 42 is provided for closing the housing 12 at the end 16 and this forms together with an electrical connection element 44 a cover-connection element unit 46 which can be handled as a whole and which can be fixed to the housing 12.

Figure 3:
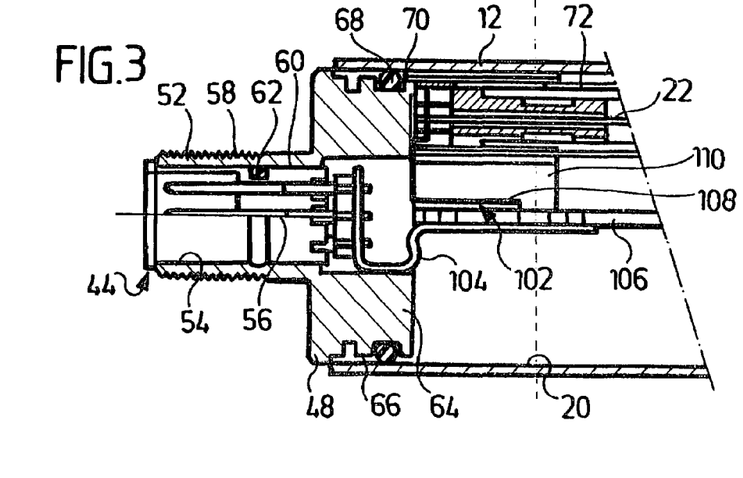
FIG. 3 shows a lateral partial sectional view of the position transducer device according to FIG. 1, with which the cover-connection element unit is fixed to the housing.

In order to form the cover-connection element unit 46, the cover 42 has a cover disk 48, by means of which an end face 50 of the housing 12 at the end 16 can be covered at least partially. A connecting piece 52 is formed in one piece on the cover disk 48, extending in the longitudinal direction 14, namely away from the end 18, and this connecting piece has a cylindrical interior 54 for accommodating a plug insert 56 (FIGS. 1 to 3). The connecting piece 52 is provided on its outer surface with an external thread 58 so that a mating connector to the plug insert 56 can be screwed onto the connecting piece 52. The plug insert 56 is held in the connecting piece 52 and, for example, is glued in it. An EMC filter is, in particular, integrated into it in order to filter out electromagnetic distortions which could be fed in via the connection element 44.

An O-ring 62 is arranged as seal between the plug insert 56 and inner walls 60 of the connecting piece 52 forming the interior 54 in order to seal the housing 12 from the exterior at the connecting piece 52.

A dip-in element 64, via which the cover 42 of the cover-connection element unit 46 dips into the interior 20 of the housing 12, is seated on the cover disk 48 and connected to this in one piece, pointing in the direction of the end 18. As a result, a dip-in area 66 is formed at the cover 42 which is, in particular, of a knurled design.

The cover-connection element unit 46 is inserted into the housing 12 via the dip-in element 64 and held on the housing 12 via the knurled design of the dip-in area 66, wherein this fixing takes place without any screws and so the assembly of the inventive position transducer device 10 and the closure of the housing 12 take place via a slip-on procedure.

In order to provide the sealing in relation to the exterior it is provided for an O-ring 68 (FIG. 3) to be arranged between the dip-in area 66 and corresponding inner walls of the housing 12.

A corresponding groove 70 is arranged in the dip-in area 66 to accommodate the O-ring 68.

Figure 4:
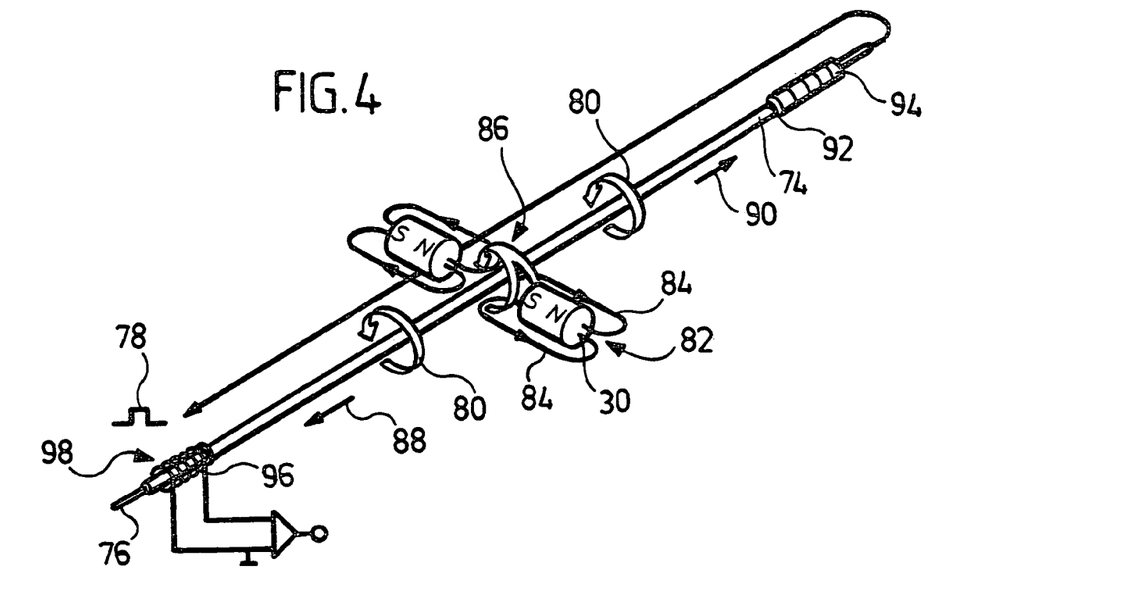
FIG. 4 shows a schematic view of a magnetostrictive measuring sensor.

A holder 72 for the measuring sensor 22 is seated on the dip-in element 64 of the cover-connection element unit 46, pointing in the direction of the end 18. This measuring sensor is, as shown in FIG. 4, designed as a waveguide 74 and, for example, is of a tubular design or is present in wire form. It is produced, for example, from a nickel-iron alloy. A copper conductor 76 is threaded into it.

An exciting current pulse originating from a measurement interface triggers a measurement as measurement signal. The exciting current pulse 78 is triggered by means of a starting signal. The exciting current pulse 78 generates a circular magnetic field 80 which is bundled in the waveguide 74 on account of soft-magnetic properties of this waveguide. The position transmitter 30, for example, a permanent magnet is arranged at a measuring location 82 of the waveguide 74, wherein the magnetic field lines 84 of this magnet extend at right angles to the circular magnetic field 80 and are likewise bundled in the waveguide 74.

In an area 86, in which the two magnetic fields 80 and 84 are superimposed, an elastic deformation results in the micro-region of the structure of the waveguide 74 on account of magnetostriction. This elastic deformation again causes an elastic wave propagating along the waveguide 74 in opposite directions 88, 90. The speed of propagation of this wave in the waveguide 74 is in the order of magnitude of approximately 2800 m/s and is to a great extent insensitive to environmental influences.

A damping member 94 is provided at one end 92 of the waveguide 74 and as a result of this damping member the transonic wave running to this end 92 is damped so that the part reflected back during the signal detection can be disregarded in comparison with the directly propagating wave.

A signal converter 98 is arranged at the other end 96 and this generates an electrical signal by reversing the magnetostrictive effect and magnetic induction and supplies this to a measurement interface.

The propagation time of the wave from the place of origin 82 as far as the signal converter 98 is directly proportional to the distance between the position transmitter 30 and the signal converter 98. The distance between the signal converter 98 and the position transmitter 30 can therefore be determined with considerable accuracy by means of a time measurement. The primary measurement signal for this time measurement is the exciting current pulse 78 on the waveguide 74 and its reaction pulse which is supplied by the signal converter 98 to the measurement interface offset in time as a function of the distance between the signal converter 98 and the position transmitter 30.

The holder 72 is designed such that it accommodates the measuring sensor 22, including waveguide and signal converter 98, in a cylindrical receiving means 100. As a result, the measuring sensor 22 is held in the interior 20 of the housing 12 via the holder 72 by means of the cover-connection element unit 46, i.e., that part of the measuring sensor 22 outside the receiving means 100 extends in the longitudinal direction 14 in the housing 12, i.e., extends in a self-supporting manner in it.

The position of the signal converter 98 in the receiving means 100 determines the measurement area.

An internal circuit arrangement, which is designated as a whole in FIG. 3 as 102 and which serves, inter alia, for activating the measuring sensor 22 and can thereby be connected via the connection element 44, in particular, to an external measurement interface, is likewise arranged on the cover-connection element unit 46. For this purpose, the connection element 44 is connected via a film conductor or wire conductor 104 to a holding plate 106 which, again, is seated on the cover 42, namely on the dip-in element 64, and points in the direction of the end 18. The holding plate 106 is equipped with the electronic components of the circuit arrangement 102. Proceeding from this holding plate 106, a further film conductor 108 connects the measuring sensor 22 electrically to the holding plate 106, i.e., to the circuit arrangement 102 and therefore, on the other hand, to the connection element 44. The film conductor 104 is connected to the holding plate 106 on one side while the film conductor 108 is connected to the holding plate on the opposite side. In this way, the cover-connection element unit 46 may be produced first of all and a connection contact to the holding plate 106 may also be provided via the film conductor 104 while the measuring sensor 22 can then be positioned on the cover-connection element unit 46 via the receiving means 100 and the electrical connection can be formed via the film conductor 108, via a corresponding connection element 110 and the film conductor 108.

The circuit arrangement 102 is arranged with respect to the cover-connection element unit 46 such that a good thermal contact prevails between the cover 42 and the circuit arrangement 102 so that a thermal balance can quickly be achieved. The cover 42 is preferably produced from a metal with a high electrical and/or thermal conductivity.

The holding plate 106 extends in longitudinal direction 14 to the end 18 and has a length which corresponds, for example, to half of the length or two thirds of the length of the housing 12. A width of the holding plate 106 transversely to the longitudinal direction 14 corresponds essentially to an inner diameter of the housing 12. The holding plate 106 is arranged on a diameter of the cover 42, i.e., a longitudinal axis of the holding plate 106 coincides with an axis of symmetry of the cover 42. In this way, the cover-connection element unit 46 may be fixed in the housing 12 via the holding plate 106 which prevents any shifting of the cover-connection element unit 46 in the housing 12. The holding plate 106 therefore brings about an additional fixing and, in particular, clamping of the cover-connection element unit 46 to the housing 12.

In the vicinity of its front end 112 the holding plate 106 has oppositely located clamping elements 114 which are designed to be elastically movable transversely to the longitudinal direction 14. A clamping element 114 thereby has a clamping nose 116, the lateral surface 118 of which projects beyond the rest of a side surface 120 of the holding plate 106 in the state not acted upon by a force.

If the holding plate 106 is pushed into the interior 20 of the housing 12, the clamping nose 116 is pressed as a result, while the cover-connection element unit 46 is being pushed into the housing 12, in a direction 120 transverse to the longitudinal direction. On the other hand, the clamping element 114 then exerts a force on corresponding inner walls of the housing 12 in a direction contrary to the direction 120 and, as a result, brings about a fixing of the holding plate 106 in the housing 12 when no more force is exerted accordingly in longitudinal direction 14, i.e., when the cover-connection element unit 46 is fixed on the housing via its dip-in area 66.

The surface 118 has a slanting plane 122, via which a clamping nose 116 can be moved in the direction 120 during the insertion of the cover-connection element unit 46 with the holding plate 106.

At its front end 112, the holding plate 106 is provided, in addition, with a bevel 124 which facilitates the insertion of the cover-connection element unit 46 into the housing 12.

For the production of the position transducer device 10 in accordance with the invention, the cover-connection element unit 46 is produced, the measuring sensor is connected to this mechanically, namely via the receiving means 100, and electrically via the film conductor 108 and the connection element 110. As a result, a cover-connection element-measuring sensor unit designated in FIG. 2 as a whole as 126 is formed. This may be tested separately.

After completion of the corresponding electrical tests, this unit 126 is inserted into the housing 12, namely is pushed into the housing from the open end 16 as a unit, i.e., as a whole. In this respect, care is taken that the measuring sensor 22 is aligned with the marking 28, i.e., that the distance is minimal.

The cover-connection element unit 46 is then fixed to the housing 12 without screws via the knurled area of the dip-in area 66, wherein the holding plate 106 with its clamping elements 114 provides for an additional clamping fixing and also positional fixing (with respect to directions which are located transverse to the direction 120 and the longitudinal direction 14). In this way, the measuring sensor 22 is, on the one hand, positioned securely in the housing 12 extending in the longitudinal direction 14 thereof and, on the other hand, the housing 12 is closed by the cover 42. At the same time, the connection of the connection element 44 to the measuring sensor is already provided.

The front end 18 is closed by the cover 32 as described above.

To produce the cover-connection element unit and the circuit arrangement 102, the individual elements (cover 42, connection element 44, dip-in element 64, holding plate 106) may be connected, in particular, without screws, for example, via embossing, riveting, pressure or adhesion.

A high system of protection (such as IP 67) may be achieved with little expenditure by means of the O-ring seal between the dip-in element 64 and the housing 12.

In a variation of one embodiment, it is provided for a holder for the measuring sensor 22 to be arranged in the housing 12 (not shown in the drawings). For example, the housing is produced, for this purpose, by means of extrusion and has an extruded profile with a corresponding bore for accommodating the measuring sensor 22. A groove can also be provided accordingly, for example, in order to be able to fix the circuit arrangement 102 in the interior of the corresponding housing.

The inventive position transducer device 10 may be fixed via the housing 12 to an application, for example, a machine tool. The moving machine part, the distance of which is intended to be determined and with which the position transmitter 30 is connected, is free floating relative to the housing 12, i.e., the guide means for the machine part and, therefore, the position transmitter 30 is not coupled to the position transducer device 10.

It may be provided in accordance with the invention for the housing 12 to be fixed to the application via spaced retaining clamps.

Figure 5:
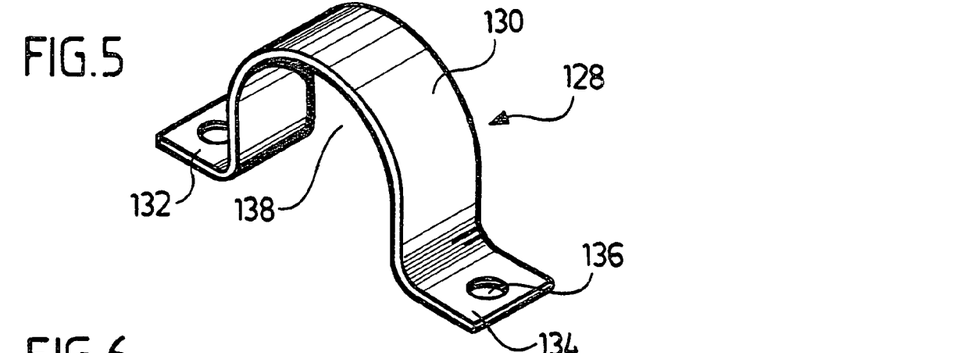
FIG. 5 shows a first embodiment of a retaining clamp.

A first embodiment of a retaining clamp which is shown in FIG. 5 and designated as a whole as 128 is of a bracket-like design and has a holding bracket 130, on which holding tongues 132 and 134 are seated at the respective ends, corresponding recesses 136 being formed in these tongues and the retaining clamps 128 being adapted to be fixed on the application via screws or bolts via these recesses. A fixing receiving means 138 is formed between the holding bracket 130 and a plane of the holding tongues 132, 134 and the housing can be inserted into this receiving means. The holding bracket 130 thereby acts from above (facing away from the application) on the housing 12 and thereby clamps the position transducer device 10 against the application when the retaining clamp 128 is fixed to the application accordingly via the holding tongues 132 and 134.

Figure 6:
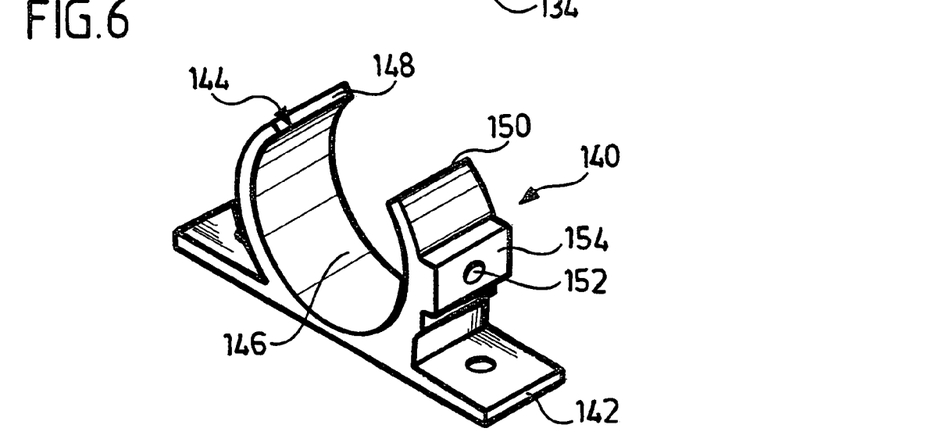
FIG. 6 shows a second embodiment of a retaining clamp.

In a second embodiment of a retaining clamp which is shown in FIG. 6 and designated as a whole as 140, a holding plate 142 is provided which can be positioned on an application and can be fixed to this, for example, via screw connections or bolt connections. A holding clip 144 is seated on the holding plate 142 and is, in particular, formed in one piece on it, this holding clip having a fixing receiving means 146 which has a cross section in the shape of a section of a circle. Corresponding holding walls of the holding clip 144 are, therefore, shaped like a circular arc, wherein ends 148, 150 are located opposite one another in spaced relationship.

The housing 12 of the position transducer device 10 can be inserted into this fixing receiving means 146. A continuous recess 152 is formed on the holding clip 144 and a fixing screw can act on the housing 12 in the fixing receiving means 146 via this recess and can clamp it in the holding clip 144, in particular, in a force-locking manner. For this purpose, the recess 152 is provided with an internal thread.

In order to have a longer thread guidance for such a fixing screw, a block-shaped feed-through element 154, which is seated, in particular, in one piece on the holding clip 144, is formed around the recess 152 on an outer side of the holding clip 144 which faces away from the fixing receiving means 146.

Various arrangements of the feed through element 154 and the recess 152 can be provided, i.e., a longitudinal axis of the recess 152 can have different angular positions in relation to the holding plate 142 depending on the type of retaining clamp 140. (Depending on the application, it may be more advantageous for the recess 152 to have a greater angle in relation to the holding plate 142 or a smaller angle, i.e., be located closer to the holding plate 142).

Figure 7:
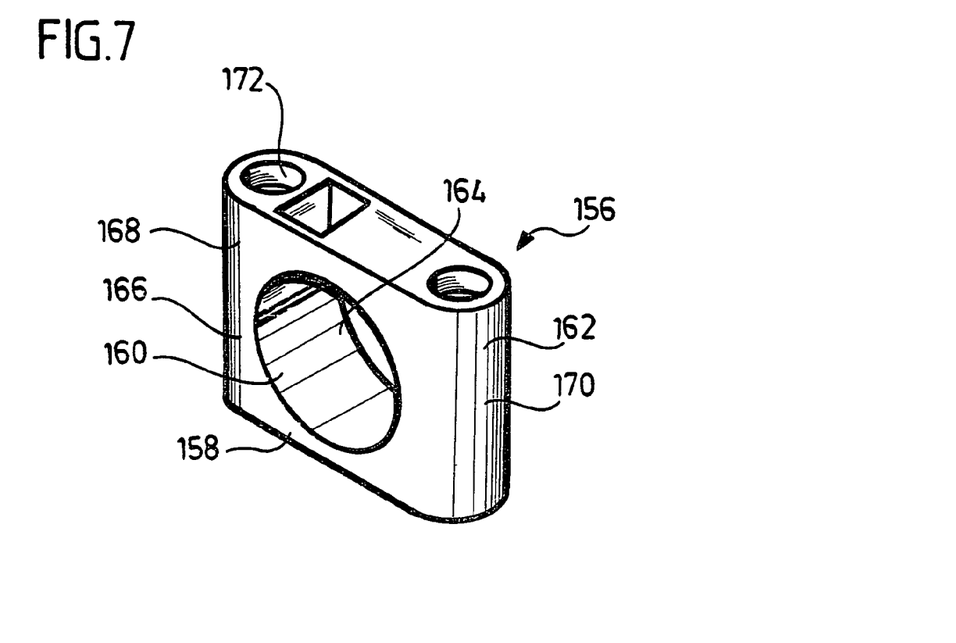
FIG. 7 shows a third embodiment of a retaining clamp.

In a third embodiment of a retaining clamp which is shown in FIG. 7 and designated as a whole as 156, a first holding element 158 is provided with a semicircular, first holding recess 160 and a second holding element 162 with a semicircular, second holding recess 164, wherein the two holding recesses 160, 164 together form a fixing receiving means for the housing 12 of the inventive position transducer device 10.

In the embodiment shown in FIG. 7, the two holding elements 158 and 162 are of a yoke-shaped design and connected to one another in one piece at one yoke bone whereas they are not connected to one another at their respective, other yoke bones 166, 168. On account of a corresponding elastic design of the retaining clamp 156, in particular, via the corresponding selection of the material for producing the retaining clamp 156, the first holding recess 160 and the second holding recess 164 may, as a result, be pivoted on one side with a pivot axis which is located in the region of the connected yoke bone 170. As a result, the distance between the yoke bones 166 and 168 may be varied.

The housing 12 is placed in the fixing receiving means. A recess 172 provided with a thread passes through the yoke bone 168 and the yoke bone 166 at least partially so that a fixing screw can fix the two yoke bones 168 and 166 against one another and, therefore, the second holding element 162 can move towards the first holding element 158 so that the housing 12 of the position transducer device 10 can be clamped in the fixing receiving means 160, 164. The corresponding fixing screw can serve at the same time for fixing the retaining clamp 156 on the application.

The retaining clamps 128 and 140 (FIGS. 5 and 6) are preferably manufactured from a metallic material whereas the retaining clamp 156 (FIG. 7) is preferably manufactured from a plastic material.

It may also be provided for the application to have a holding recess for the housing 12 of the position transducer device 10. For example, a cylindrical recess 176 is formed in a machine block 174 for this purpose (FIG. 8) and the position transducer device 10 can be pushed into this recess. The housing 12 of the position transducer device 10 may then be fixed on the machine block via a fixing screw 178. The housing 12 may thereby be utilized as a guide for a position transmitter.

Figure 10:
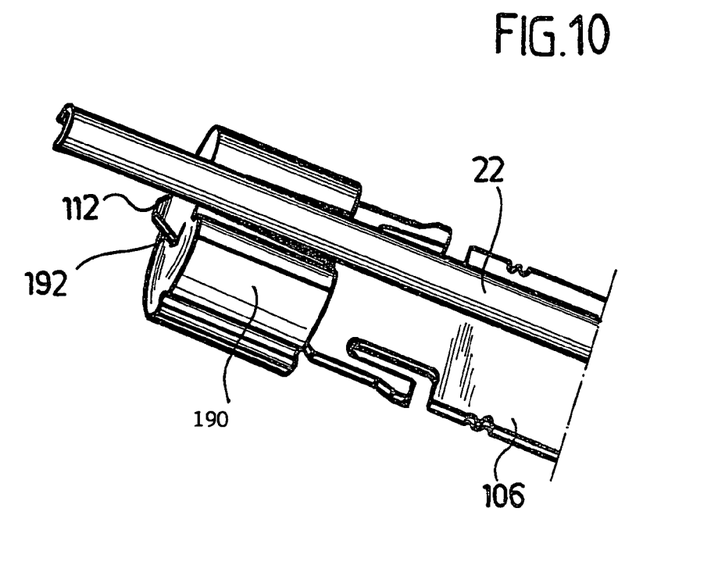

In a variation of one embodiment which is shown schematically in FIG. 10, a plug 190, which is produced, in particular, from a porous material, such as expanded rubber or Styrofoam, is arranged on the holding plate 106 at or in the region of its front end 112.

In order to accommodate this plug 190, the holding plate 106 is provided at its front end 112 with a shoulder 192, onto which the plug 190 can be pushed and on which it is then held.

The plug serves for the thermal insulation relative to the cover 32. It has been shown that when using a corresponding plug 190 it is possible for the position transducer device 10 to heat up more quickly, i.e., for the stationary operating phase following the switching on to be reached more quickly.

It may be provided for the plug 190 to be pushed onto the shoulder 192 of the holding plate 106 and then the cover-connection element unit 46 to be pushed into the housing 12 with the holding plate 106 and the plug 190. This is provided, in particular, when the housing 12 is closed at its front end, i.e., when the corresponding cover is formed in one piece on the housing.

However, it may also be provided for the plug 190 to be pushed in the housing onto the holding plate 106 from an open end 18 and, subsequently, for the cover 32 to be fixed on the housing 12.

As a result of the tubular, cylindrical design of the housing 12, this may be produced in a simple and inexpensive manner. This shape is also advantageous for the application since the housing 12 and, with it, the position transducer device 10 have a high rigidity on account of an optimized ratio of mass and geometrical moment of inertia.

The flattened area 26 allows an improved handling capability, in particular, during the production and also during the procedure for fixing the position transducer device 10 to an application.

Figure 8:
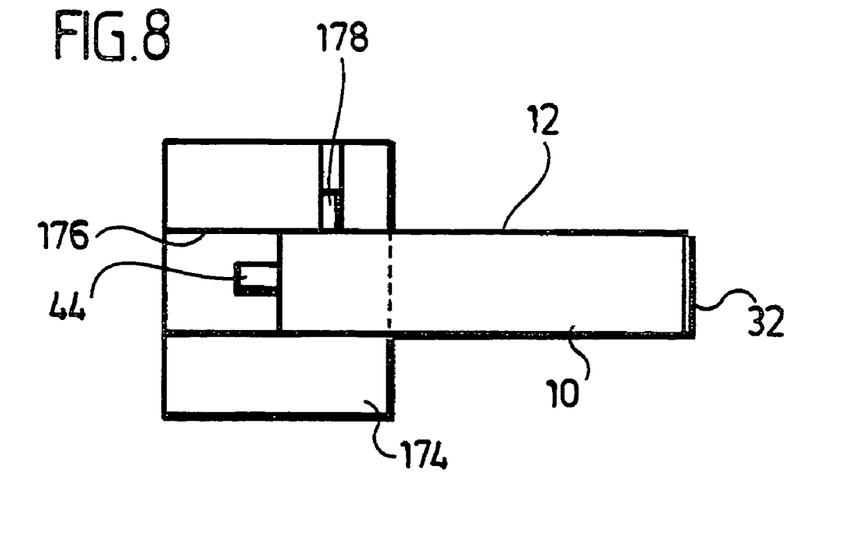
FIG. 8 shows a further embodiment of a possibility for fixing an inventive position transducer device to an application.

On account of the essentially rotationally symmetric design of the housing 12, the inventive position transducer device 10 may, as shown in FIG. 8, be fixed in a simple manner to an application when a corresponding recess 156 is provided. The position transducer device 10 may be turned into the desired sensor position prior to its fixing in the recess 176, i.e., turned into the position, in which the active measurement side, indicated to the user by the marking 28, is in the desired position.

In addition, various types of retaining clamp (FIGS. 5 to 7) may be used on account of the cylindrical design of the housing 12 in order to fix the position transducer device 10 to an application. As a result, the fixing may, again, be optimized for a special application.

As a result of the fact that the position transmitter 30 is free floating relative to the housing 12 and the position transducer device 10 can be turned in a fixing receiving means prior to the final fixing on account of its cylindrical design, a user has great flexibility with respect to the positioning of the position transducer device 10 on an application. For example, an increased variability with respect to the direction of the cable outlet from the connection element 44 is present.

Figure 9:
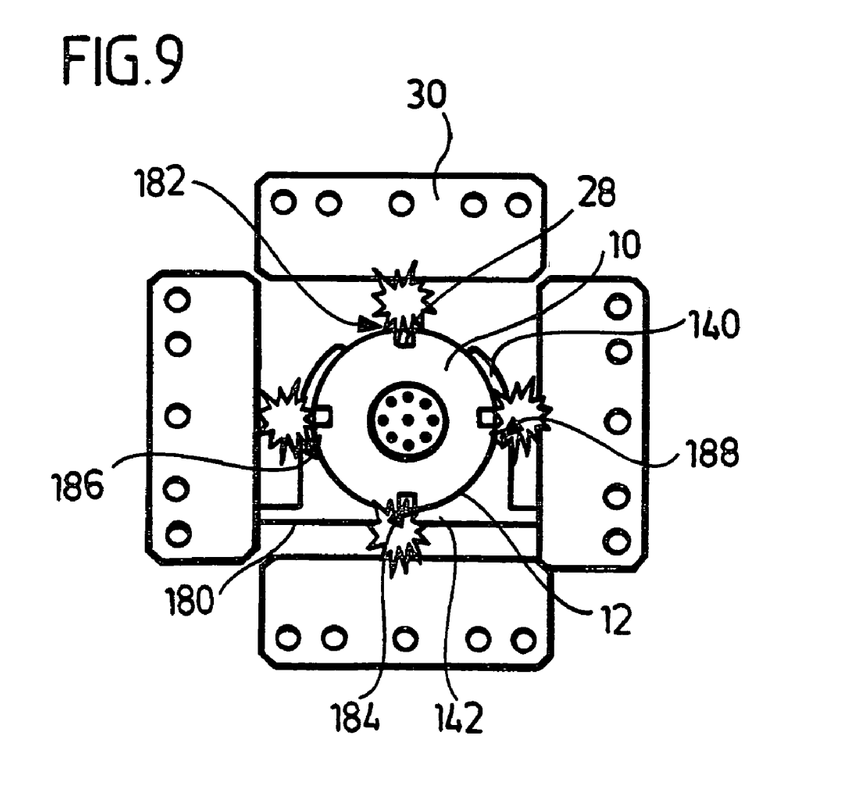
FIG. 9 shows a schematic illustration of the possibilities for positioning an inventive position transducer device on an application and FIG. 10 shows a perspective partial view of a variation of one embodiment without a housing, with which a plug is arranged on a holding plate.

A position transducer device is shown in FIG. 9 by way of example and this is fixed via retaining clamps 140 to an application 180, for example, a machine. In a first position 182, the active side of the position transducer device 10 faces away from the holding plate 142 and the position transmitter 30 is moved parallel to the holding plate above the retaining clamp 140.

If, on the other hand, the position transmitter 30 is moved below the holding plate 142, this may be brought about in a simple manner, for example, proceeding from the position 182 in that the housing 12 is turned through 180°. This is indicated in FIG. 9 by the position with the reference numeral 184.

If the position transmitter 30 is moved in the longitudinal direction 14 to the side of the retaining clamp 140, the housing 12 may be turned through 90° to the left or right proceeding from the position 182 in order to bring the active side of the position transducer device 10 into an optimized coupling contact with the position transmitter 30. This is indicated in FIG. 9 by the positions with the reference numerals 186 and 188.

In the respective measuring positions of the position transducer device 10, the distance, in particular, between the marking 28 and the position transmitter 30 is minimized in relation to other rotary positions of the housing 12, i.e., the distance between the measuring sensor 22 and the position transmitter 30 is minimized in relation to other rotary positions of the measuring sensor 22.

What is claimed is:

1. Position transducer device for detecting the position of a position transmitter, comprising:
    a housing extending in a longitudinal direction; and
    a measuring sensor arranged in the housing and extending parallel to the longitudinal direction;
    the position transmitter being coupled to said measuring sensor in a noncontacting manner;
    wherein:
    an outer surface of the housing is adapted to be enclosed at least partially by a fixing receiving means for fixing the housing to an application; and
    the housing is rotatable relative to the position transmitter in the fixing receiving means to adjust the distance between the measuring sensor and the position transmitter.

2. Position transducer device as defined in claim 1, wherein the outer surface of the housing has a high degree of symmetry with respect to the longitudinal direction of the housing.

3. Position transducer device as defined in claim 1, wherein the outer surface is essentially rotationally symmetric with respect to the longitudinal direction of the housing.

4. Position transducer device as defined in claim 1, wherein a housing surface has a marking extending in a longitudinal direction and indicating a measurement side.

5. Position transducer device as defined in claim 4, wherein the measuring sensor is at a minimum distance in relation to the marking.

6. Position transducer device as defined in claim 4, wherein one or more transverse markings are provided, said markings indicating the measurement area on the housing.

7. Position transducer device as defined in claim 1, wherein the housing is of a cylindrical design.

8. Position transducer device as defined in claim 1, wherein the housing is of a tubular design.

9. Position transducer device as defined in claim 1, wherein the housing has a flattened area on its outer surface, the housing being adapted to be placed on a support by means of said flattened area.

10. Position transducer device as defined in claim 1, wherein the position transmitter is free floating relative to the housing.

11. Position transducer device as defined in claim 1, wherein the position transmitter is guided on the housing.

12. Position transducer device as defined in claim 1, wherein the fixing receiving means is designed as a retaining clamp.

13. Position transducer device as defined in claim 12, wherein the retaining clamp is of a bracket-like design such that the housing is adapted to be fixed between a holding bracket of the retaining clamp and the application.

14. Position transducer device as defined in claim 12, wherein the retaining clamp is of a clip-like design, wherein the housing is adapted to be fixed in the holding clip.

15. Position transducer device as defined in claim 14, wherein the position transducer device is adapted to be fixed on the retaining clamp via one or more fixing screws between the housing and the holding clip.

16. Position transducer device as defined in claim 12, wherein the retaining clamp comprises a first holding element with a first holding recess and a second holding element with a second holding recess, wherein the housing of the position transducer device is held between the two holding elements in the two holding recesses.

17. Position transducer device as defined in claim 16, wherein the two holding elements are adapted to be fixed to one another via one or more fixing screws.

18. Position transducer device as defined in claim 1, wherein the housing of the position transducer device is adapted to be fixed on an application in a recess.

19. Position transducer device as defined in claim 1, wherein the housing is produced from a material with a high electrical and/or thermal conductivity.

20. Position transducer device as defined in claim 1, wherein the housing is open at both ends so that it is closable by covers.

21. Position transducer device as defined in claim 1, wherein a cover for closing the housing is adapted to be fixed to it without screws.

22. Position transducer device as defined in claim 21, wherein the cover for closing the housing has a knurled area for dipping into the housing.

23. Position transducer device for detecting the position of a position transmitter, comprising:
    a housing extending in a longitudinal direction;
    a measuring sensor arranged in the housing and extending parallel to the longitudinal direction; and
    an electrical connection element arranged on the housing;
    wherein:
    the position transmitter is coupled to said measuring sensor in a noncontacting manner;
    a cover for closing the housing at one end and the connection element are connected to one another as a cover-connection element unit;
    this cover-connection element unit is fixed on the housing via the cover;
    the cover has a dip-in area, the cover dipping into an interior of the housing by means of said area and the cover-connection element unit being fixed on the housing without screws by means of the dip-in area;
    one or more seals are arranged between the dip-in area and a housing inner wall;
    the cover-connection element unit has a holding element extending in the longitudinal direction, the cover-connection element unit being adapted to be fixed in the housing by means of said holding element; and
    the holding element has one or more clamping elements, the holding element being adapted to be clamped on the housing by means of said clamping elements.

24. Position transducer device as defined in claim 23, wherein the cover-connection element unit is pushed into the housing and fixed on it.

25. Position transducer device as defined in claim 23, wherein the measuring sensor is held in the housing by the cover-connection element unit.

26. Position transducer device as defined in claim 23, wherein an internal circuit arrangement of the position transducer device is arranged on the cover-connection element unit.

27. Position transducer device as defined in claim 23, wherein an internal circuit arrangement is seated on the holding element.

28. Position transducer device as defined in claim 23, wherein said one or more seals comprises an O-ring.

29. Position transducer device for detecting the position of a position transmitter, comprising:
   a housing extending in a longitudinal direction;
   a measuring sensor arranged in the housing and extending parallel to the longitudinal direction; and
   an electrical connection element arranged on the housing; wherein:
   the position transmitter is coupled to said measuring sensor in a noncontacting manner;
   a cover for closing the housing at one end and the connection element are connected to one another as a cover-connection element unit;
   this cover-connection element unit is fixed on the housing via the cover;
   the cover has a dip-in area, the cover dipping into an interior of the housing by means of said area and the cover-connection element unit being fixed on the housing without screws by means of the dip-in area;
   one or more seals are arranged between the dip-in area and a housing inner wall; and
   a plug consisting of a porous material is arranged in the housing at or in the vicinity of an end facing away from the cover of the cover-connection element unit.

30. Position transducer device as defined in claim 29, wherein the cover-connection element unit is designed such that a good thermal contact prevails between the cover and an internal circuit arrangement seated on the cover-connection element unit.

31. Position transducer device as defined in claim 23, wherein the housing is of a cylindrical design with at least one open end for the cover-connection element unit.

32. Position transducer device as defined in claim 23, wherein the housing is of a tubular design.

* * * * *